(12) United States Patent
Frantz et al.

(10) Patent No.: US 11,989,183 B2
(45) Date of Patent: May 21, 2024

(54) LINKING DATA SETS

(71) Applicant: SIGMA COMPUTING, INC., San Francisco, CA (US)

(72) Inventors: Jason D. Frantz, San Francisco, CA (US); Robert C. Woollen, San Rafael, CA (US); Massimo D. Siboldi, San Francisco, CA (US); Max H. Seiden, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 33 days.

(21) Appl. No.: 16/925,137

(22) Filed: Jul. 9, 2020

(65) Prior Publication Data

US 2021/0109933 A1    Apr. 15, 2021

Related U.S. Application Data

(60) Provisional application No. 62/912,878, filed on Oct. 9, 2019.

(51) Int. Cl.
*G06F 16/24* (2019.01)
*G06F 16/22* (2019.01)
*G06F 16/2455* (2019.01)

(52) U.S. Cl.
CPC ...... *G06F 16/24553* (2019.01); *G06F 16/221* (2019.01)

(58) Field of Classification Search
CPC .................................. G06F 16/24553
USPC .......................................... 707/791
See application file for complete search history.

(56) References Cited

U.S. PATENT DOCUMENTS

| | | | |
|---|---|---|---|
| 2007/0055922 A1 | 3/2007 | Martynov et al. | |
| 2012/0216104 A1* | 8/2012 | Bae | G06F 40/18 715/212 |
| 2016/0162496 A1* | 6/2016 | Gopalakrishnan | G06F 16/116 707/756 |
| 2017/0193116 A1* | 7/2017 | Wong | G06F 16/2428 |
| 2021/0294813 A1* | 9/2021 | Knecht | G06F 16/252 |

FOREIGN PATENT DOCUMENTS

EP   3188043 A1   7/2017

OTHER PUBLICATIONS

International Search Report and Written Opinion, PCT/US2020/054833, dated Jan. 12, 2021, 11 pages.

* cited by examiner

*Primary Examiner* — Syling Yen

(57) ABSTRACT

Linking data sets, including receiving a selection of a first column of a first data set related to a second column of a second data set; in response to the selection, generating a query based on a relationship between the first column of the first data set and the second column of the second data set; and presenting a third data set based on a response to the query.

18 Claims, 9 Drawing Sheets

FIG. 4

GUI 302

| Matter | Partner | Assigned |
|--------|---------|----------|
| 18114 | MJD | KKL |
| 17231 | CFB | RDG |
| 21011 | CFB | RDG |
| 15141 | MJD | KKL |
| 18114 | RCO | JTH |
| 17231 | CFB | JTH |
| 15141 | MJD | JTH |
| 16946 | RCO | KKL |
| 00101 | RCO | JTH |
| 18114 | MJD | RDG |
| 16946 | RCO | JTH |
| 16946 | CFB | KKL |
| 21011 | MJD | JTH |
| 18114 | MJD | RDG |
| 17231 | CFB | KKL |
| 15141 | CFB | KKL |

GUI 302

| Matter | Partner | Assigned | Assigned Title | Assigned Name |
|---|---|---|---|---|
| 18114 | MJD | KKL | Senior Associate | Ken Lawrence |
| 17231 | CFB | RDG | Patent Agent | Robert Green |
| 21011 | CFB | RDG | Patent Agent | Robert Green |
| 15141 | MJD | KKL | Senior Associate | Ken Lawrence |
| 18114 | RCO | JTH | Of Counsel | Julie Harris |
| 17231 | CFB | JTH | Of Counsel | Julie Harris |
| 15141 | MJD | JTH | Of Counsel | Julie Harris |
| 16946 | RCO | KKL | Senior Associate | Ken Lawrence |
| 00101 | RCO | JTH | Of Counsel | Julie Harris |
| 18114 | MJD | RDG | Patent Agent | Robert Green |
| 16946 | RCO | JTH | Of Counsel | Julie Harris |
| 16946 | CFB | KKL | Senior Associate | Ken Lawrence |
| 21011 | MJD | JTH | Of Counsel | Julie Harris |
| 18114 | MJD | RDG | Patent Agent | Robert Green |
| 17231 | CFB | KKL | Senior Associate | Ken Lawrence |
| 15141 | CFB | KKL | Senior Associate | Ken Lawrence |

402a

304 ns with data communications networks such as IP data communications networks, and in ways as will occur to those of skill in the art. Communications adapters implement the hardware level of data communications through which one computer sends data communications to another computer, directly or through a data communications network. Examples of communications adapters useful in computers configured for linking data sets according to embodiments of the present invention include modems for wired dial-up communications, Ethernet (IEEE 802.3) adapters for wired data communications, and 802.11 adapters for wireless data communications.

LINKING DATA SETS

CROSS-REFERENCE TO RELATED APPLICATION

This application is a non-provisional application for patent entitled to a filing date and claiming the benefit of earlier-filed U.S. Provisional Patent Application Ser. No. 62/912,878, filed Oct. 9, 2019.

BACKGROUND

Field of the Invention

The field of the invention is data processing, or, more specifically, methods, apparatus, and products for linking data sets.

Description Of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and apparatus for linking data sets are disclosed in this specification. Linking data sets may include receiving a selection of a first column of a first data set related to a second column of a second data set; in response to the selection, generating a query based on a relationship between the first column of the first data set and the second column of the second data set; and presenting a third data set based on a response to the query.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a diagram of an example graphical user interface configured for linking data sets according to embodiments of the present invention.

FIG. 5 sets forth a diagram of an example graphical user interface configured for linking data sets according to embodiments of the present invention.

DETAILED DESCRIPTION

Figure 1:
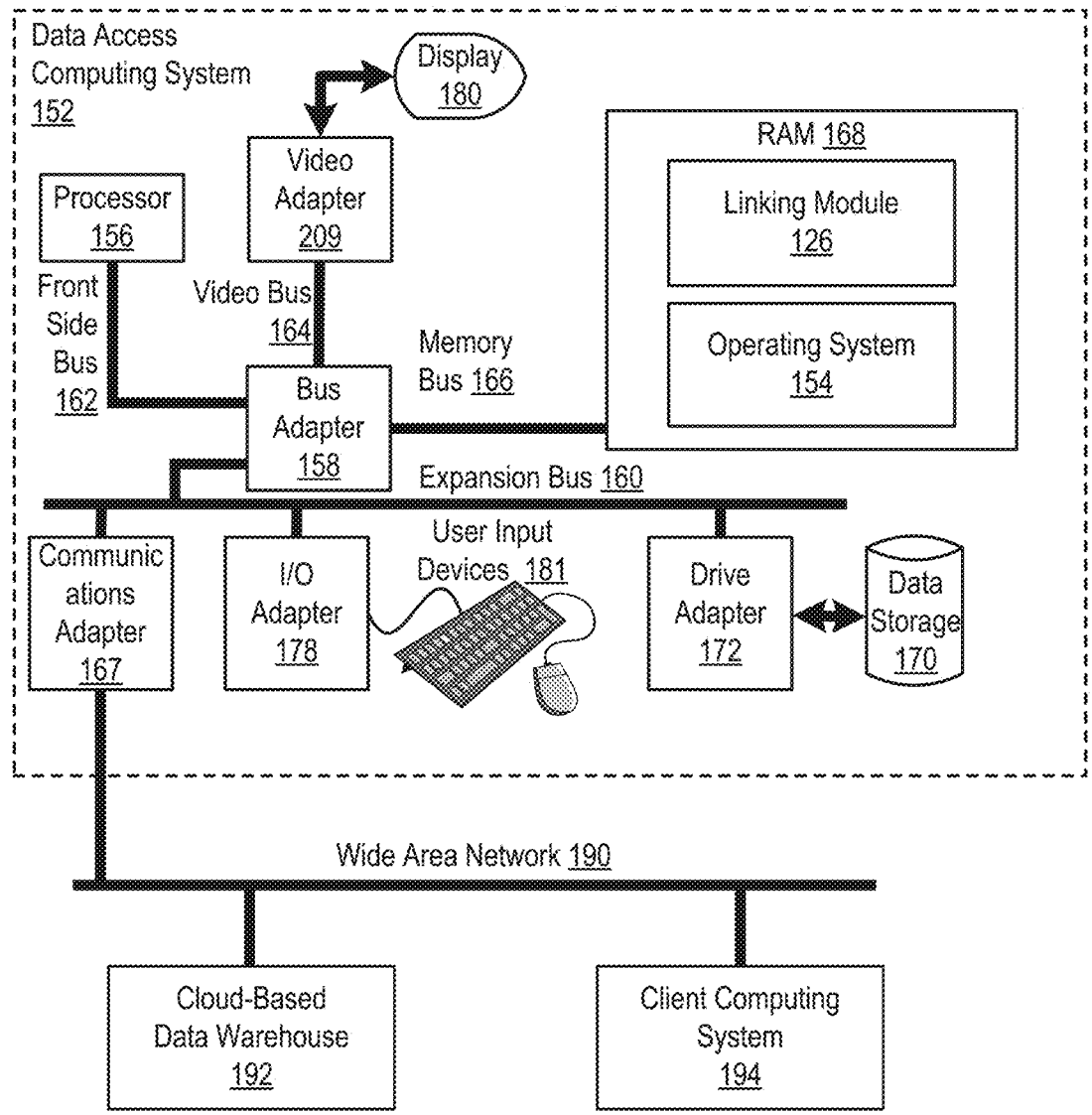
FIG. 1 sets forth a block diagram of an example system configured for linking data sets according to embodiments of the present invention.

Exemplary methods, apparatus, and products for linking data sets in accordance with the present invention are described with reference to the accompanying drawings, beginning with FIG. 1. FIG. 1 sets forth a block diagram of automated computing machinery comprising an exemplary data access computing system (152) configured for linking data sets according to embodiments of the present invention. The data access computing system (152) of FIG. 1 includes at least one computer processor (156) or 'CPU' as well as random access memory (168) ('RAM') which is connected through a high speed memory bus (166) and bus adapter (158) to processor (156) and to other components of the data access computing system (152).

Stored in RAM (168) is an operating system (154). Operating systems useful in computers configured for linking data sets according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the linking module (126), a module for linking data sets according to embodiments of the present invention.

The data access computing system (152) of FIG. 1 includes disk drive adapter (172) coupled through expansion bus (160) and bus adapter (158) to processor (156) and other components of the data access computing system (152). Disk drive adapter (172) connects non-volatile data storage to the data access computing system (152) in the form of data storage (170). Disk drive adapters useful in computers configured for linking data sets according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data access computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data access computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data access computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for linking data sets according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the data access computing system (152).

Figure 2:
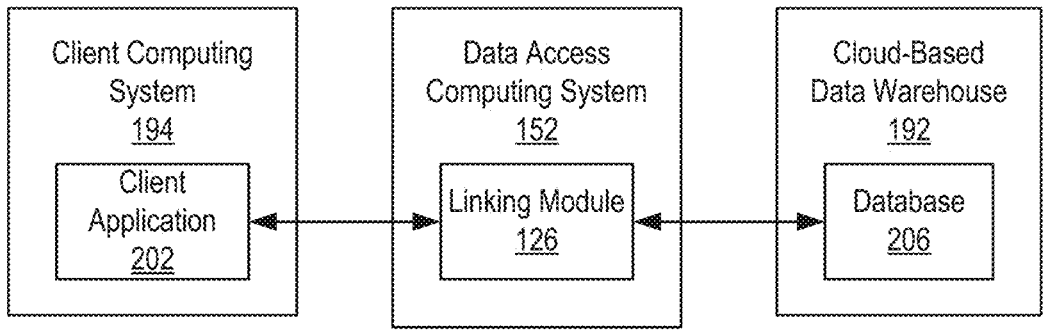
FIG. 2 sets forth a block diagram of an example system configured for linking data sets according to embodiments of the present invention.

FIG. 2 shows an exemplary block diagram of a system for linking data sets according to embodiments of the present invention. As shown in FIG. 2, the system includes a data access computing system (152), a cloud-based data warehouse (192) and a client computing system (196). The data access computing system (152) includes a linking module (126). The cloud-based data warehouse (192) includes a database (206). The client computing system (196) includes a client application (202).

The database (206) is a collection of data stored in the cloud-based data warehouses (192) and management systems for the data. The management systems may receive database queries, such as structure query language (SQL) queries, and respond to queries with a data set. The linking module (196) is hardware, software, or an aggregation of hardware and software configured to manage relationships (e.g., "links") between data sets and facilitate browsing or navigation of linked data sets by a user. Data sets may include tables (e.g., tables in the database (206), spreadsheet presentations or views of data generated by the data access computing system (152), or other data sets.

A first data set may be related to a second data set through a relationship between a first column of the first data set and a second column of a second data set. The first column of the first data set may serve as a foreign key to the second column of the second data set. The second column of the second data set may serve as a primary key for the second data set. As an example, assume that a first table "MATTER" stores, for each row, a particular matter for a law firm. Each row may use, as its primary key, a "Matter Number" column. The "MATTER" table may also include a "Partner" column indicating a partner of the firm managing the matter. The "Partner" column may be related to a second table "USER" that stores, for each row, a record for each user of the system. Accordingly, the "Partner" column of the "MATTER" table may be related to a "User ID" or other primary key column of the "USER" table.

Multiple columns of a first data set may be related to the same column of a second data set. Continuing with the example above, assume that the "MATTER" table also includes an "Assigned" column indicating an attorney or employee tasked with completing a particular matter. The "Assigned" column may also be related to the "USER" table. Thus, both the "Partner" column and the "Assigned" column of the "MATTER" table may be related to a "User ID" or other primary key column of the "USER" table.

Multiple columns of a first data set may also each be related to different data sets. Still continuing with the example above, assume that the "MATTER" table includes a "Client" column indicating a client that submitted the particular matter. The "Client" column may be related to a "CLIENT" table listing, for each row, a particular client as well as their contact information, etc. Thus, the "MATTER" table includes different columns related to the "USER" table and the "CLIENT" table, respectively.

A user browsing or navigating a first data set may also wish to explore data in a second, related data set. For example, a user browsing a "MATTER" table using a spreadsheet view or other presentation may wish to see, for each row, related information in the "USER" table for an assigned attorney for each matter, such as their full name or job title. Typically, for a user to view this information, the user would need to generate a database query (e.g., a JOIN operation) to join the "MATTER" table with the "USER" table, which may be difficult for users not familiar with database queries. Alternatively, presenting the "MATTER" table may cause all related tables to be joined and presented, which would result in increased computational burdens and network traffic, as well as potentially presenting unneeded information to the user.

To address these shortcomings, the linking module (126) may receive a selection of a first column of a first data set related to a second column of a second data set. For example, a presentation of the first data set (e.g., a spreadsheet) may include a selectable element for each column in the first data set related to another column of another data set. Such selectable elements may include buttons, links (e.g., a link as a column name), or other elements. Selection of the selectable element of the first column by a user (e.g., via a client application (202)) may cause the linking module (126) to receive the selection.

The selectable element may be applied to or associated with another column corresponding to the first column. For example, assume that a that the "MATTER" table includes both a "Partner ID" column, storing a user ID of a partner, and a "Partner Initials" column, storing the initials of the partner. The "Partner ID" column may be related to the "User ID" field of the "USER" table. That is, the "Partner ID" serves as a foreign key to the "User ID" primary key of the "USER." When presenting the "MATTER" table, the "Partner ID" field may be hidden, as the "Partner ID" may only contain a unique identifier that is not useful to a user or viewer. Instead, the "Partner Initials" column may be displayed with the selectable element. Selecting the selectable element for the "Partner Initials" column serves to select, as the first column, the associated and hidden "Partner ID" column.

In response to the selection, the linking module (126) may generate a query based on the relationship between the first column of the first data set and the second column of the second data set. For example, data indicating the relationship may be accessed, and the data may indicate the first column of the first data set and the second column of the second data set. The linking module (126) may then generate a JOIN query of the first data set and the second data set on the first column and the second column (e.g., where a value for the first column of the first data set equals a value of the second column of the second data set). The data indicating the relationship may also indicate a subset of the columns of the second data set to be joined with the first data set.

Continuing the example with the "Assigned" column of the "MATTER" table being related to the "User ID" column of the "USER" table, the data indicating the relationship may indicate that only a "Name" and "Title" column from the "USER" table be selected when joined with the first data set. The query may also include additional selections of filters previously applied to the presentation of the first data set (e.g., value constraints, selected columns, etc.).

The linking module (126) then presents a third data set based on a response to the query. The third data set thus includes the first data set and related information from the second data set presented in-line. The third data set may include a spreadsheet presentation of the response to the query. The third data set may be based on a subset of the response to the query according to one or more filters, search criteria, access grants, etc. Using this approach, database queries to select and join related data set information are generated and submitted only in response to a user selection to explore the related information.

The linking module (126) may receive an indication of the relationship between the first column of the first data set and the second column of the second data set from an administrator or other user of the data access computing system (152) or the cloud-based data warehouse (192). The indication of the relationship may identify the first column and the second column. The indication of the relationship may also indicate one or more columns of the second data set to be included in a JOIN with the first data set. The indication of the relationship may also indicate, if the first column of the first data set is hidden or not selected for presentation, an associated column such that selection of the associated column serves to select the first column. For example, where the first column stores unique identifiers (e.g., numeric identifiers), the associated column may include a human readable value or text string that is more informative. The indication of the relationship may be stored in metadata associated with the first data set and/or the second data set.

The linking module (126) may (e.g., in response to a request to present the first data set) access data indicating one or more relationships associated with the first data set. The linking module (126) may then identify, from the data, the relationship between the first column of the first data set and the second column of the second data set and include, in a presentation of the first data set, based on the identified relationship, a selectable element (e.g., a button, a link associated with the first column). This process may be performed when presenting the third data set (e.g., the first data set joined with one or more columns of the second data set). For example, the linking module (1236) may access data indicating one or more relationship associated with the second data set (e.g., associated with one or more columns of the second data set joined with the first data set). The presentation of the third data set may then include, based on an identified relationship, a selectable element associated with one or more of the joined columns from the second data set. Thus, as additional columns of related information are joined, additional related data sets may be come accessible to the user.

Figure 3:
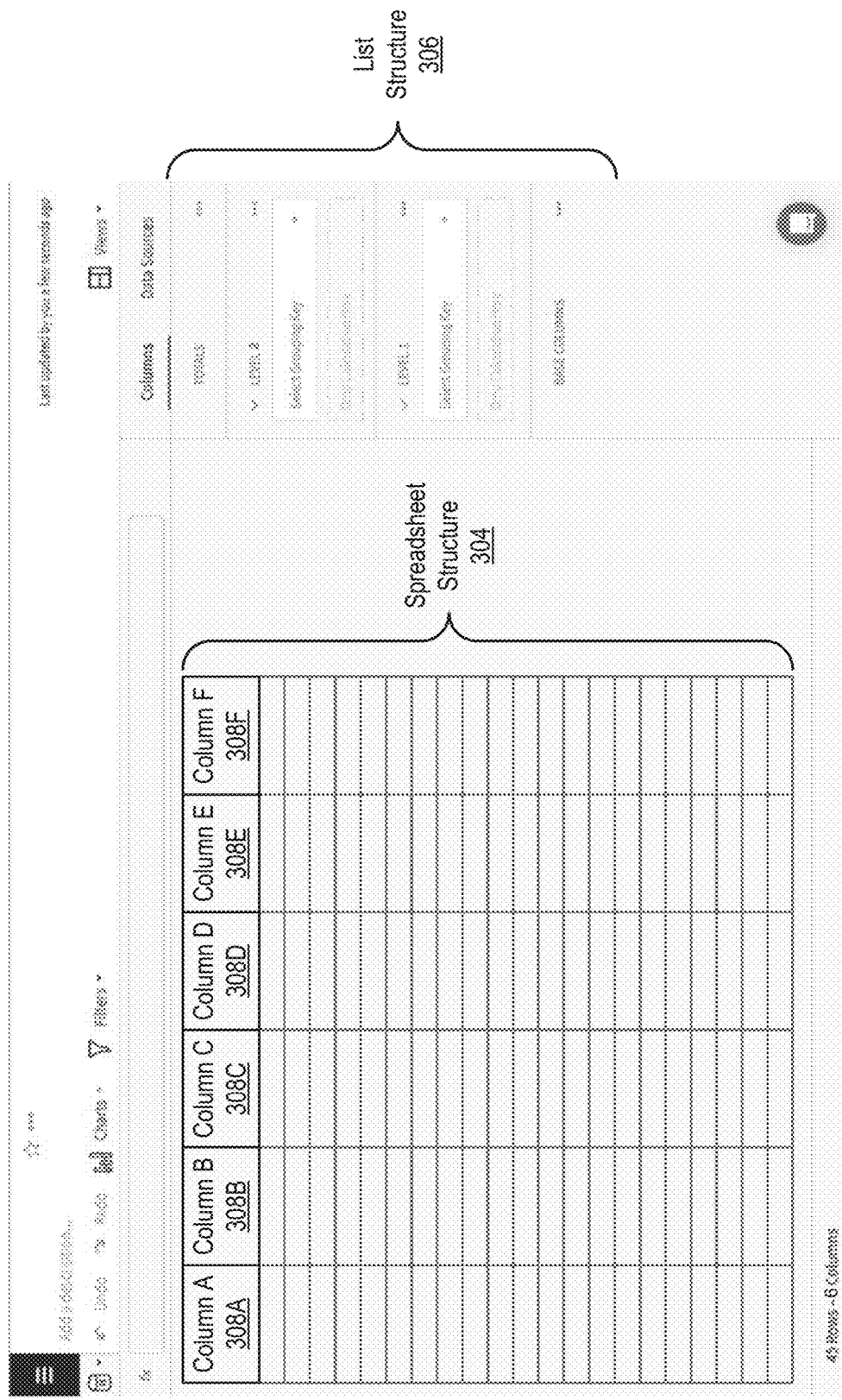
FIG. 3 sets forth a diagram of an example graphical user interface configured for linking data sets according to embodiments of the present invention.

FIG. 3 shows an exemplary user interface for linking data sets according to embodiments of the present invention. Shown is a graphical user interface (GUI) (302). The GUI (302) is a user interface that presents a data set and graphical elements to a user and receives user input from the user. The GUI (302) may be presented, in part, by the linking module (126) and displayed on a client computing system (194) (e.g., on a system display or mobile touchscreen). The GUI (302) may be encoded by an Internet application hosted on the data access computing system (152) for rendering by the client application (202) of the client computing system (194).

The GUI (302) presents, in part, worksheets to a user. A worksheet is a presentation of a data set from a database (306). A referencing worksheet is a worksheet that is linked from another worksheet (referred to as a data source worksheet). The referencing worksheet inherits the data set presented in the data source worksheet (i.e., data not excluded from presentation). The referencing worksheet may also inherit the results of formula applied to other data but not the formulas themselves. The referencing worksheet may be limited to the data set presented or otherwise made available in the data source worksheet (unless the user generating the referencing worksheet has access to excluded data in the database). A referencing worksheet may be linked from any number of data sources, including multiple data source worksheets.

The exemplary GUI (302) includes a spreadsheet structure (304) and a list structure (306). The spreadsheet structure (304) includes a data set (shown as empty rows) with six columns (column A (308A), column B (308B), column C (308C), column D (308D), column E (308E), column F (308F)).

The spreadsheet structure (304) is a graphical element and organizing mechanism for the data set. The spreadsheet structure (304) displays the data within the data set as rows of data organized by columns (column A (308A), column B (308B), column C (308C), column D (308D), column E (308E), column F (308F)). The columns delineate different categories of the data in each row of the data set. The columns may also be calculations using other columns in the data set.

The list structure (306) is a graphical element used to define and organize the hierarchical relationships between the columns (column A (308A), column B (308B), column C (308C), column D (308D), column E (308E), column F (308F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (306) presents a dimensional hierarchy to the user. Specifically, the list structure (306) presents levels arranged hierarchically across at least one dimension. Each level within the list structure (306) is a position within a hierarchical relationship between columns (column A (308A), column B (308B), column C (308C), column D (308D), column E (308E), column F (308F)). The keys within the list structure (306) identify the one or more columns that are the participants in the hierarchical relationship. Each level may have more than one key.

One of the levels in the list structure (306) may be a base level. Columns selected for the base level provide data at the finest granularity. One of the levels in the list structure (306) may be a totals or root level. Columns selected for the totals level provide data at the highest granular level. For example, the totals level may include a field that calculates the sum of each row within a single column of the entire data set (i.e., not partitioned by any other column).

The GUI (302) may enable a user to drag and drop columns (column A (308A), column B (308B), column C (308C), column D (308D), column E (308E), column F (308F)) into the list structure (306). The order of the list structure (306) may specify the hierarchy of the columns relative to one another. A user may be able to drag and drop the columns in the list structure (306) at any time to redefine the hierarchical relationship between columns. The hierarchical relationship defined using the columns selected as keys in the list structure (306) may be utilized in charts such that drilling down (e.g., double click on a bar), enables a new chart to be generated based on a level lower in the hierarchy.

FIG. 4 shows an exemplary user interface for linking data sets according to embodiments of the present invention. Shown is a graphical user interface (GUI) (302). The GUI (302) may be presented, in part, by the linking module (126) and displayed on a client computing system (194) (e.g., on a system display or mobile touchscreen). The GUI (302) may be encoded by an Internet application hosted on the data access computing system (152) for rendering by the client application (202) of the client computing system (194).

In this example, assume a first data set for tracking legal matters. The first data set includes a "MATTER" table. Each record (e.g., row) corresponds to a particular case or matter. Accordingly, each row may include columns "Matter" for a matter number, "Partner" indicating a partner at the law firm managing a particular matter, and "Assigned" indicating an attorney or other employee assigned to the matter. This data set is reflected in the spreadsheet structure (304) of the worksheet.

The exemplary user interface of FIG. 4 also includes selectable elements 402a and 402b, corresponding to the "Assigned" and "Partner" columns, respectively. Both the "Assigned" and "Partner" columns are related to a "User ID" column of a "USER" table. Selection of the selectable element (402a) indicates that information from the "USER" table related to the "Assigned" column should be displayed in the GUI (302). In other words, selection of the selectable element (402a) causes a query to be generated based on a JOIN of the "MATTER" table and the "USER" table on the "Assigned" column of the "MATTER" table and the "User ID" column of the "USER" table. Selection of the selectable element (402b) indicates that information from the "USER" table related to the "Partner" column should be displayed in the GUI (302). In other words, selection of the selectable element (402b) causes a query to be generated based on a JOIN of the "MATTER" table and the "USER" table on the "Partner" column of the "MATTER" table and the "User ID" column of the "USER" table.

FIG. 5 shows an exemplary user interface for linking data sets according to embodiments of the present invention. FIG. 5 differs from FIG. 4 in that FIG. 5 also includes an "Assigned Title" and "Assigned Name" columns. Assume that the selectable element (402a) of FIG. 4 was selected, causing a JOIN to be performed on the "MATTER" table and the "USER" table on the "Assigned" column of the "MATTER" table and the "User ID" column of the "USER" table. The "Title" and "Name" columns of the "USER" table were selected for inclusion in the resulting data set. Accordingly, the GUI (302) of FIG. 5 includes a spreadsheet structure (304) of a third data set based on the first data set and the second data set.

Figure 6:
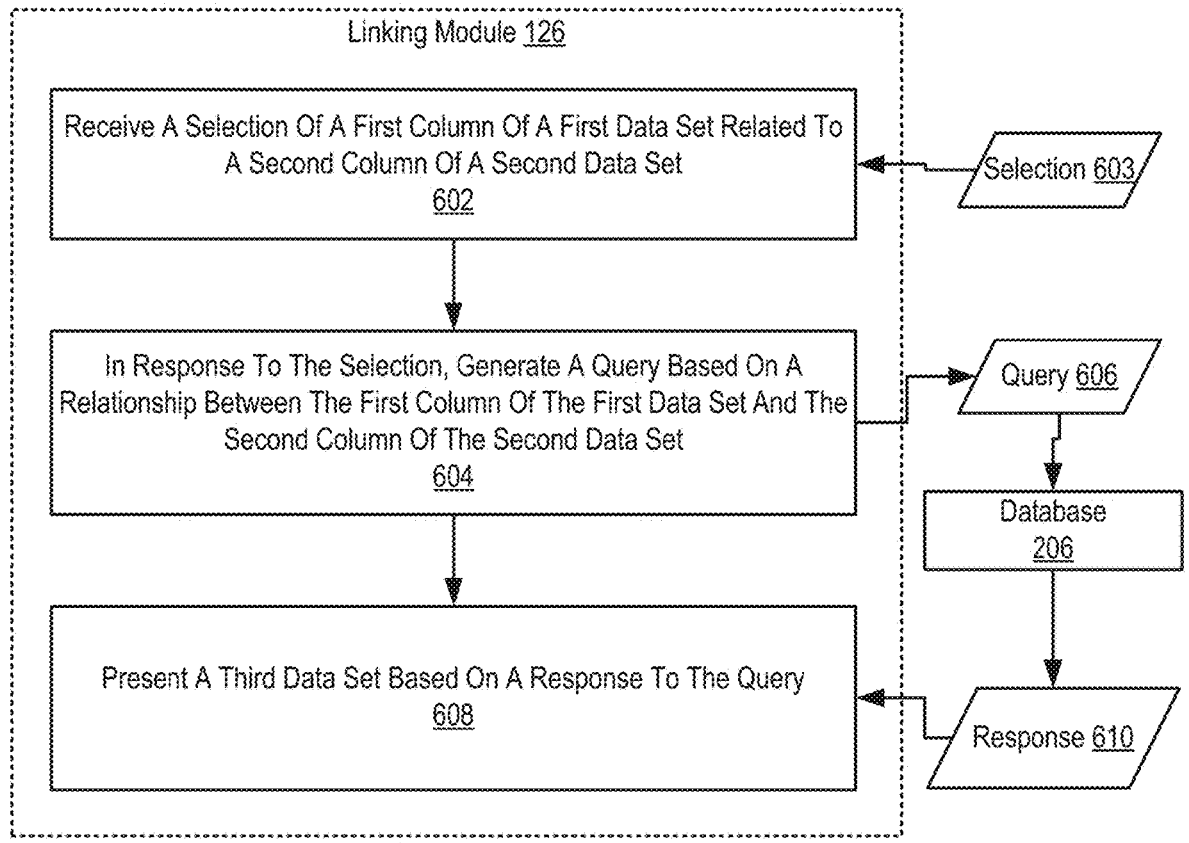
FIG. 6 sets forth a flow chart illustrating an exemplary method for linking data sets according to embodiments of the present invention.

For further explanation, FIG. 6 sets forth a flow chart illustrating an exemplary method for linking data sets according to embodiments of the present invention that includes receiving (602) (e.g., by a linking module (126)) a selection (603) of a first column of a first data set related to a second column of a second data set. For example, a presentation of the first data set (e.g., a spreadsheet) may include a selectable element for each column in the first data set related to another column of another data set. Such selectable elements may include buttons, links (e.g., a link as a column name), or other elements. Selection of the selectable element of the first column by a user (e.g., via a client application (202)) may cause the linking module (126) to receive the selection. The selection may be made with respect to the first column as displayed in the presentation of the first data set, or with respect to a column related to the first column if the first column is hidden or not selected for inclusion in the presentation.

The method of FIG. 6 also includes, in response to the selection (603), generating (604) (e.g., by the linking module (126)) a query (606) based on the relationship between the first column of the first data set and the second column of the second data set. The query (606) may comprise a JOIN query of the first data set and the second data set on the first column and the second column (e.g., where a value for the first column of the first data set equals a value of the second column of the second data set). The query (606) may also include a selection (e.g., a SELECT command) of subset of the columns of the second data set to be joined with the first data set. The query (606) may also include additional selections of filters previously applied to the presentation of the first data set (e.g., value constraints, selected columns, etc.). The query (606) may be submitted (e.g., by the linking module (126)) to a database (206).

The method of FIG. 6 also includes presenting (608) (e.g., by the linking module (126)) a third data set based on a response (610) to the query (606). The third data set thus includes the first data set and related information from the second data set presented in-line (e.g., in a same spreadsheet structure (304) or same GUI (302)). The third data set may be based on a subset of the response to the query (606) according to one or more filters, search criteria, access grants, etc.

Figure 7:
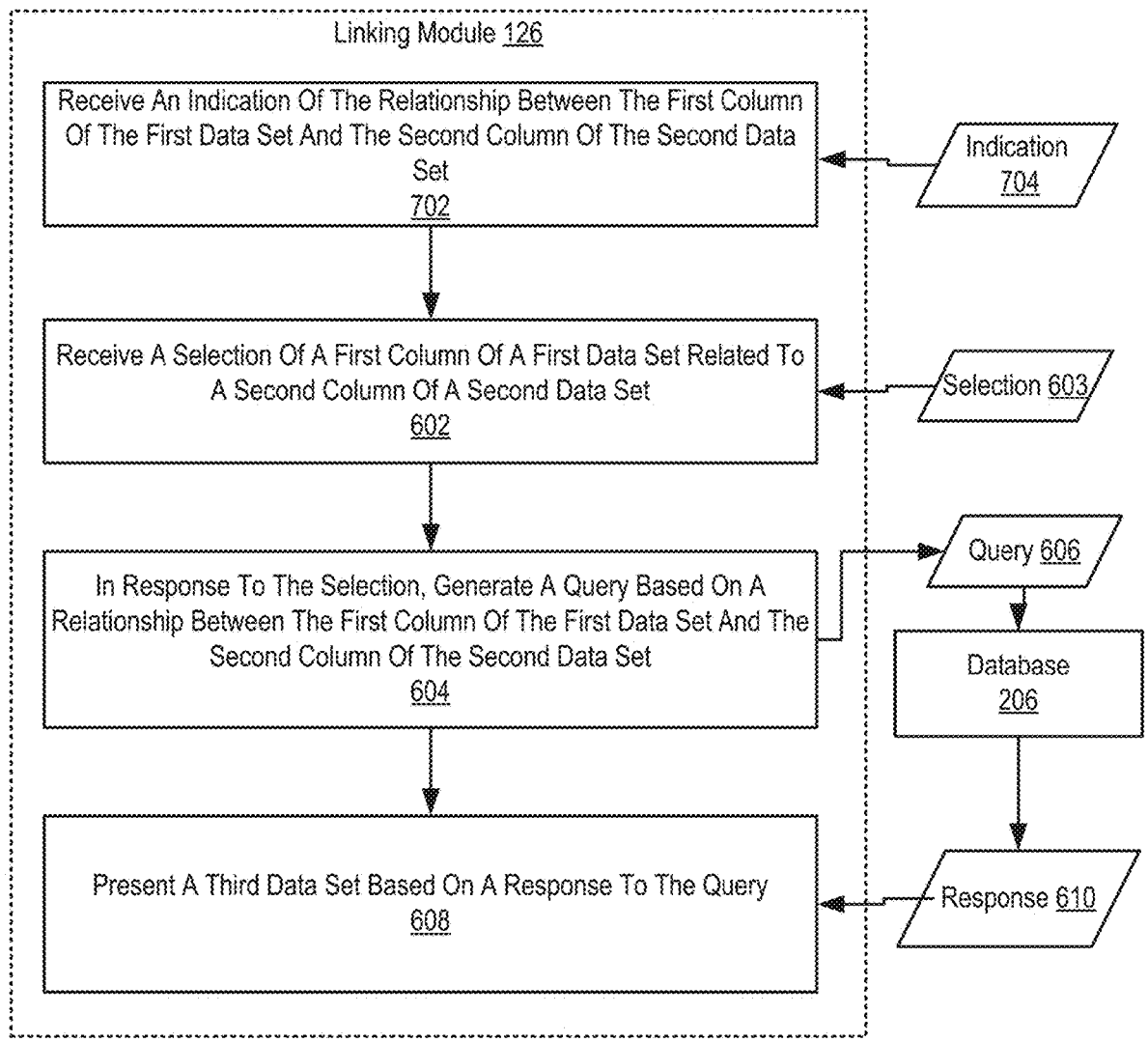
FIG. 7 sets forth a flow chart illustrating an exemplary method for linking data sets according to embodiments of the present invention.

For further explanation, FIG. 7 sets forth a flow chart illustrating an exemplary method for linking data sets according to embodiments of the present invention that includes receiving (602) (e.g., by a linking module (126)) a selection (603) of a first column of a first data set related to a second column of a second data set; in response to the selection (603), generating (604) (e.g., by the linking module (126)) a query (606) based on the relationship between the first column of the first data set and the second column of the second data set; and presenting (608) (e.g., by the linking module (126)) a third data set based on a response (610) to the query (606).

The method of FIG. 7 differs from FIG. 6 in that the method of FIG. 7 includes receiving (702) (e.g., by the linking module (126)) an indication (704) of the relationship between the first column of the first data set and the second column of the second data set. The indication (704) may be received from an administrator or other user of the data access computing system (152) or the cloud-based data warehouse (192). The indication (704) of the relationship may identify the first column and the second column. The indication (704) of the relationship may also indicate one or more columns of the second data set to be included in a JOIN with the first data set. The indication (704) of the relationship may also indicate, if the first column of the first data set is hidden or not selected for presentation, an associated column such that selection of the associated column serves to select the first column. For example, where the first column stores unique identifiers (e.g., numeric identifiers), the associated column may include a human readable value or text string that is more informative. The indication (704)

of the relationship may be stored in metadata associated with the first data set and/or the second data set.

Figure 8:
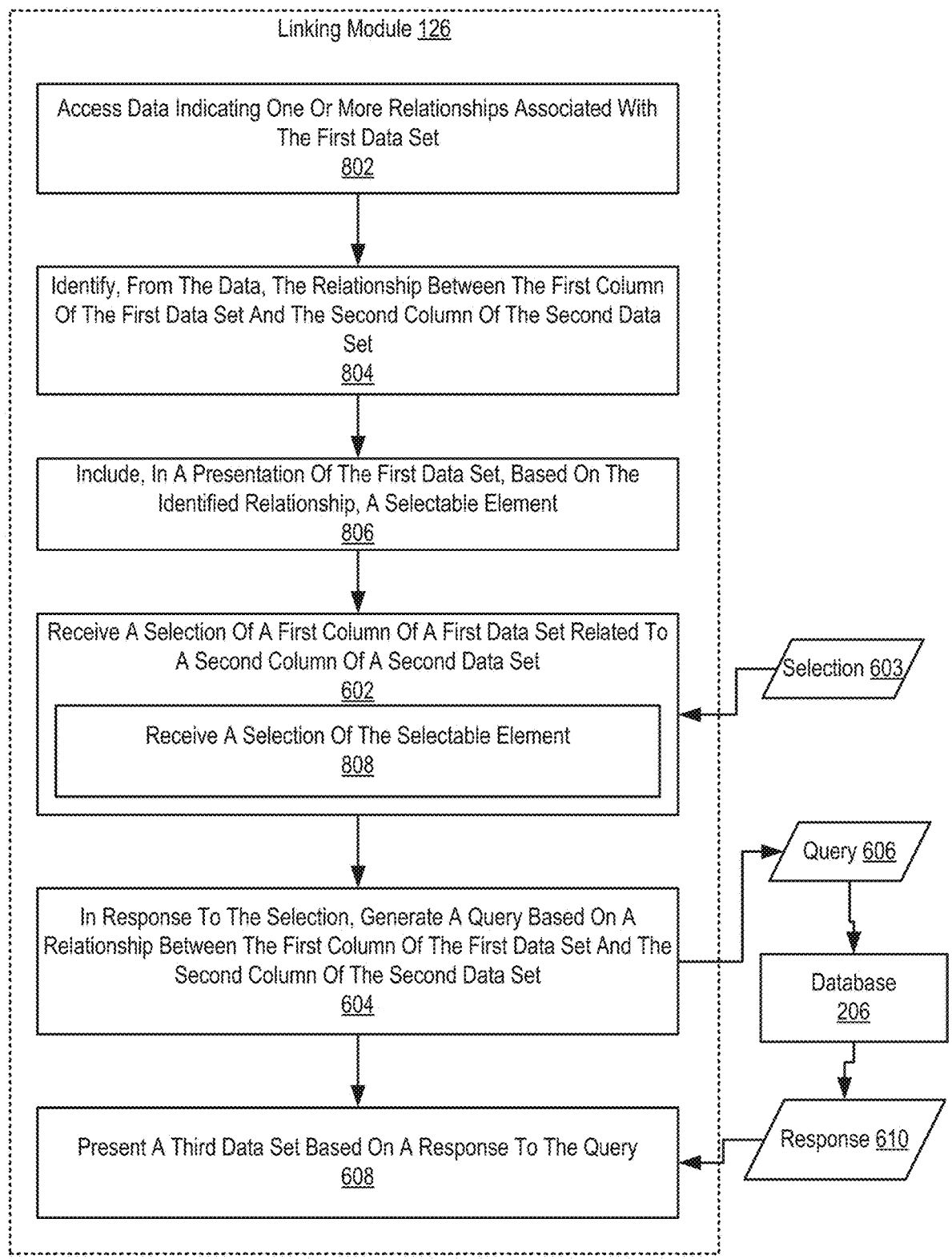
FIG. 8 sets forth a flow chart illustrating an exemplary method for linking data sets according to embodiments of the present invention.

For further explanation, FIG. 8 sets forth a flow chart illustrating an exemplary method for linking data sets according to embodiments of the present invention that includes receiving (602) (e.g., by a linking module (126)) a selection (603) of a first column of a first data set related to a second column of a second data set; in response to the selection (603), generating (604) (e.g., by the linking module (126)) a query (606) based on the relationship between the first column of the first data set and the second column of the second data set; and presenting (608) (e.g., by the linking module (126)) a third data set based on a response (610) to the query (606).

The method of FIG. 8 differs from FIG. 6 in that the method of FIG. 8 includes accessing (802) data indicating one or more relationships associated with the first data set. The data may include metadata indicating one or more relationships associated with the first data set. The data may be based on previously received indications of relationships associated with the first data set. The data may be accessed in response to a presentation or request to present the first data set or a portion of the first data set.

The method of FIG. 8 further differs from FIG. 6 in that the method of FIG. 8 also includes identifying (804) (e.g., by the linking module (126)), from the data, the relationship between the first column of the first data set and the second column of the second data set. The method of FIG. 8 further differs from FIG. 6 in that the method of FIG. 8 also includes including (806) (e.g., by the linking module (126)), in a presentation of the first data set, based on the identified relationship, a selectable element. The selectable element may include a button, a link, or other user interface element as can be appreciated. The selectable element may be applied to or associated with another column corresponding to the first column. For example, assume that a that the "MATTER" table includes both a "Partner ID" column, storing a user ID of a partner, and a "Partner Initials" column, storing the initials of the partner. The "Partner ID" column may be related to the "User ID" field of the "USER" table. That is, the "Partner ID" serves as a foreign key to the "User ID" primary key of the "USER." When presenting the "MATTER" table, the "Partner ID" field may be hidden, as the "Partner ID" may only contain a unique identifier that is not useful to a user or viewer. Instead, the "Partner Initials" column may be displayed with the selectable element. Selecting the selectable element for the "Partner Initials" column serves to select, as the first column, the associated and hidden "Partner ID" column. The method of FIG. 8 further differs from FIG. 6 in that receiving (602) (e.g., by a linking module (126)) a selection (603) of a first column of a first data set related to a second column of a second data set includes receiving (808) (e.g., by the linking module (126)) a selection of the selectable element.

Figure 9:
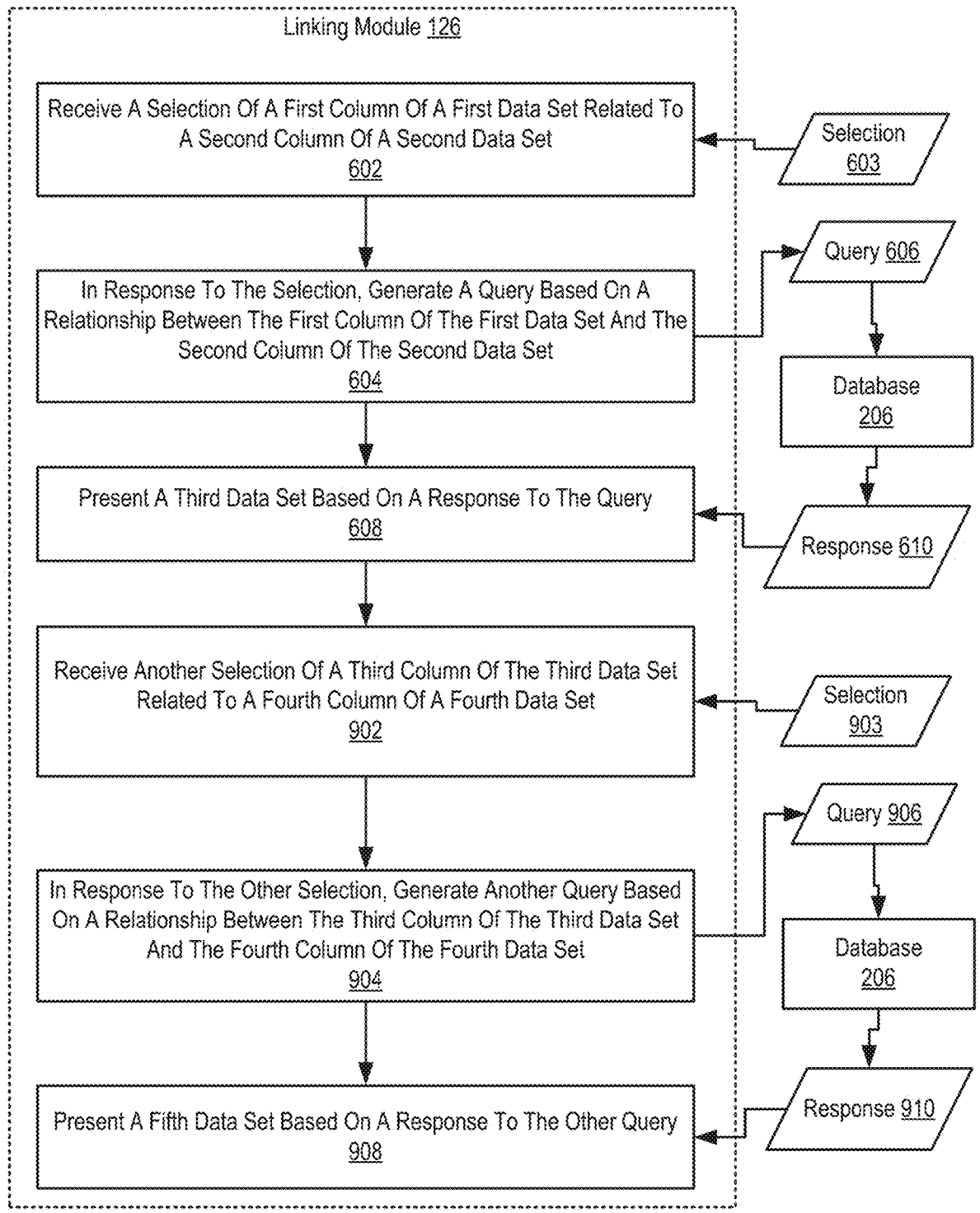
FIG. 9 sets forth a flow chart illustrating an exemplary method for linking data sets according to embodiments of the present invention.

For further explanation, FIG. 9 sets forth a flow chart illustrating an exemplary method for linking data sets according to embodiments of the present invention that includes receiving (602) (e.g., by a linking module (126)) a selection (603) of a first column of a first data set related to a second column of a second data set; in response to the selection (603), generating (604) (e.g., by the linking module (126)) a query (606) based on the relationship between the first column of the first data set and the second column of the second data set; and presenting (608) (e.g., by the linking module (126)) a third data set based on a response (610) to the query (606).

The method of FIG. 9 differs from FIG. 6 in that the method of FIG. 9 includes receiving (902) another selection (903) of a third column of the third data set related to a fourth column of a fourth data set. The third column of the third data set may correspond to a column of the first data set included in the third data set, or a column of the second data set joined with the first data set to generate the third data set. The method of FIG. 9 differs from FIG. 6 in that the method of FIG. 9 also includes, in response to the other selection (903), generating (904) another query (906) based on a relationship between the third column of the third data set and the fourth column of the fourth data set. The other query (906) may include a JOIN of the third data set and the fourth data set on the third column and fourth column. The other query (906) may be submitted to a database (206).

The method of FIG. 9 differs from FIG. 6 in that the method of FIG. 9 includes presenting (908) a fifth data set based on a response (910) to the other query (906). Thus, the fifth data set includes data from the first and second data set (reflected in the third data set) and the fourth data set.

In view of the explanations set forth above, readers will recognize that the benefits of linking data sets according to embodiments of the present invention include:

Improving the operation of a computing system by allowing for run time query generation and data set presentation in response to a request to view related information.

Improving the operation of a computing system by providing for user-friendly approaches to exploring data related across different data sets.

Exemplary embodiments of the present invention are described largely in the context of a fully functional computer system for linking and composing worksheets. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of linking data sets, the method comprising:
    receiving, from a client application by a linking module, an indication of a relationship between a first column of a first data set and a second column of a second data set, wherein the client application is on a client computing system separate from a data access computing system hosting the linking module, and wherein the indication further indicates one or more columns of the second data set to be included in a JOIN with the first data set and, based on if the first column of the first data set is either hidden or not selected for presentation, an associated column such that selection of the associated column serves to select the first column;

storing the indication in metadata associated with one of: the first data set and the second data set;

receiving, from the client application by the linking module a selection of the first column of the first data set related to the second column of the second data set;

in response to the selection, generating, by the linking module, a query based on a relationship between the first column of the first data set and the second column of the second data set, wherein the query targets a database on a cloud-based data warehouse separate from the data access computing system and the client computing system; and presenting, on the client application on the client computing system by the linking module, a third data set based on a response to the query from the cloud-based data warehouse, wherein the third data set comprises the first data set and at least a portion of the second data set.

2. The method of claim 1, wherein the query comprises a join of the first data set on the first column with the second data set on the second column, and wherein the query further comprises additional selections of filters applied to a previous presentation of the first data set.

3. The method of claim 1, further comprising receiving, by the linking module, an indication of the relationship between the first column of the first data set and the second column of the second data set, wherein the indication comprises a subset of columns of the second data set to be included in a JOIN operation with the first data set, and wherein the third data set is based on a subset of the response to the query according to one or more filters.

4. The method of claim 1, further comprising:
accessing data indicating one or more relationships associated with the first data set;
identifying, from the data, the relationship between the first column of the first data set and the second column of the second data set; and
including, in a presentation of the first data set, based on the identified relationship, a selectable element.

5. The method of claim 4, wherein receiving the selection comprises receiving a selection of the selectable element.

6. The method of claim 5, wherein the first column of the first data set comprises a foreign key associated with the second column of the second data set, and wherein the second column of the second data set comprises a primary key of the second data set.

7. The method of claim 1, further comprising:
receiving another selection of a third column of the third data set related to a fourth column of a fourth data set;
in response to the other selection, generating another query based on a relationship between the third column of the third data set and the fourth column of the fourth data set; and
presenting a fifth data set based on a response to the other query.

8. An apparatus for linking data sets, the apparatus comprising a computer processor, a computer memory operatively coupled to the computer processor, the computer memory having disposed within it computer program instructions that, when executed by the computer processor, cause the apparatus to carry out the steps of:
receiving, from a client application by a linking module, an indication of a relationship between a first column of a first data set and a second column of a second data set, wherein the client application is on a client computing system separate from a data access computing system hosting the linking module, and wherein the indication further indicates one or more columns of the second data set to be included in a JOIN with the first data set and, based on if the first column of the first data set is either hidden or not selected for presentation, an associated column such that selection of the associated column serves to select the first column;

storing the indication in metadata associated with one of: the first data set and the second data set;

receiving, from the client application by the linking module, a selection of the first column of the first data set related to the second column of the second data set;

in response to the selection, generating, by the linking module, a query based on a relationship between the first column of the first data set and the second column of the second data set, wherein the query targets a database on a cloud-base data warehouse separate from the data access computing system and the client computing system; and presenting, on the client application on the client computing system by the linking module, a third data set based on a response to the query from the cloud-based data warehouse, wherein the third data set comprises the first data set and at least a portion of the second data set.

9. The apparatus of claim 8, wherein the query comprises a join of the first data set on the first column with the second data set on the second column.

10. The apparatus of claim 8, wherein the steps further comprise:
accessing data indicating one or more relationships associated with the first data set;
identifying, from the data, the relationship between the first column of the first data set and the second column of the second data set; and
including, in a presentation of the first data set, based on the identified relationship, a selectable element.

11. The apparatus of claim 10, wherein receiving the selection comprises receiving a selection of the selectable element.

12. The apparatus of claim 11, wherein the first column of the first data set comprises a foreign key associated with the second column of the second data set, and wherein the second column of the second data set comprises a primary key of the second data set.

13. The apparatus of claim 8, wherein the steps further comprise:
receiving another selection of a third column of the third data set related to a fourth column of a fourth data set;
in response to the other selection, generating another query based on a relationship between the third column of the third data set and the fourth column of the fourth data set; and
presenting a fifth data set based on a response to the other query.

14. A computer program product for linking and composing worksheets, the computer program product disposed upon a computer readable medium, the computer program product comprising computer program instructions that, when executed, cause a computer to carry out the steps of:
receiving, from a client application by a linking module, an indication of a relationship between a first column of a first data set and a second column of a second data set, wherein the client application is on a client computing system separate from a data access computing system hosting the linking module, and wherein the indication further indicates one or more columns of the second data set to be included in a JOIN with the first data set and, based on if the first column of the first data set is either hidden or not selected for presentation, an associated column such that selection of the associated column serves to select the first column;
storing the indication in metadata associated with one of: the first data set and the second data set;
receiving, from the client application by the linking module, a selection of the first column of the first data set related to the second column of the second data set;
in response to the selection, generating, by the linking module, a query based on a relationship between the first column of the first data set and the second column of the second data set, wherein the query targets a database on a cloud-based data warehouse separate from the data access computing system and the client computing system; and
presenting, on the client application on the client computing system by the linking module, a third data set based on a response to the query from the cloud-based data warehous, wherein the third data set comprises the first data set and at least a portion of the second data set.

15. The computer program product of claim 14, wherein the query comprises a join of the first data set on the first column with the second data set on the second column.

16. The computer program product of claim 14, wherein the steps further comprise:
accessing data indicating one or more relationships associated with the first data set;
identifying, from the data, the relationship between the first column of the first data set and the second column of the second data set; and
including, in a presentation of the first data set, based on the identified relationship, a selectable element.

17. The computer program product of claim 16, wherein receiving the selection comprises receiving a selection of the selectable element.

18. The computer program product of claim 17, wherein the first column of the first data set comprises a foreign key associated with the second column of the second data set, and wherein the second column of the second data set comprises a primary key of the second data set.

\* \* \* \* \*